United States Patent [19]

Lassota

[11] Patent Number: 5,331,885
[45] Date of Patent: Jul. 26, 1994

[54] SEMIAUTOMATIC BEVERAGE MAKER AND METHOD

[75] Inventor: Zbigniew G. Lassota, DesPlaines, Ill.

[73] Assignee: Food Equipment Technologies Company, Inc., Glenview, Ill.

[21] Appl. No.: 44,112

[22] Filed: Apr. 6, 1993

Related U.S. Application Data

[63] Continuation of Ser. No. 570,861, Aug. 22, 1990, abandoned, which is a continuation of Ser. No. 352,754, May 16, 1989, abandoned, which is a continuation-in-part of Ser. No. 224,754, Jul. 27, 1988, Pat. No. 5,000,082.

[51] Int. Cl.$^5$ ............................................. A47J 31/46
[52] U.S. Cl. ........................................ 99/283; 99/299; 99/304
[58] Field of Search .................. 99/280, 282, 283, 285, 99/299, 300, 304, 305, 306, 327, 332, 335; 426/431, 432, 433, 434, 435; 222/639, 640, 641; 137/624, 11; 251/68, 129.03; 219/314, 324, 328

[56] References Cited

U.S. PATENT DOCUMENTS

| Re. 25,663 | 10/1964 | Bunn | 99/305 X |
|---|---|---|---|
| D. 152,773 | 2/1949 | Donaldson | D7/308 |
| D. 157,407 | 2/1950 | Pappas | D7/308 |
| D. 192,344 | 3/1962 | Hrabe | D7/308 |
| D. 231,646 | 5/1974 | Bardeau | D7/308 |
| D. 269,011 | 5/1983 | Stetler et al. | D7/308 |
| 1,138,107 | 5/1915 | Hill | 222/358 |
| 1,323,234 | 11/1919 | Faber | 222/44 |
| 1,395,168 | 10/1921 | Tucker | 222/44 |
| 1,840,985 | 1/1932 | Topper | 99/305 X |
| 1,930,618 | 10/1933 | Jones et al. | 222/48 X |
| 2,618,219 | 11/1952 | Hummel | 99/283 X |
| 2,684,624 | 7/1954 | Alvarez | 99/298 |
| 2,875,612 | 3/1959 | Murphey | 251/68 |
| 2,943,556 | 7/1960 | Egi et al. | 99/283 X |
| 2,956,713 | 10/1960 | Kerley, Jr. | 222/464 |
| 3,079,944 | 3/1963 | McLaughlin | 137/453 |
| 3,133,558 | 5/1964 | Fajans et al. | 137/563 |
| 3,326,115 | 6/1967 | Karlen et al. | 99/283 |
| 3,343,478 | 9/1967 | Hausam | 99/283 |
| 3,371,592 | 3/1968 | Remy et al. | 99/282 |
| 3,408,036 | 10/1968 | Smith et al. | 251/129.2 |
| 3,420,492 | 1/1969 | Ray | 251/68 |
| 3,425,337 | 2/1969 | Vittoe | 99/300 X |
| 3,443,508 | 5/1969 | Reynolds et al. | 99/305 X |
| 3,479,949 | 11/1969 | Reynolds et al. | 99/282 |
| 3,511,166 | 5/1970 | Bixby, Jr. | 99/295 |
| 3,608,471 | 9/1971 | Martin | 99/283 |
| 3,667,723 | 6/1972 | Schneider | 251/68 |
| 3,998,144 | 12/1976 | Curtis | 99/293 |
| 4,008,656 | 2/1977 | Gruner | 99/298 |
| 4,015,749 | 4/1977 | Arzberger et al. | 222/640 |
| 4,056,050 | 11/1977 | Brown | 99/299 X |
| 4,059,181 | 11/1977 | Greenfield, Jr. et al. | 222/640 X |
| 4,064,795 | 12/1977 | Ackerman | 99/305 X |
| 4,139,125 | 2/1979 | Arzberger et al. | 222/460 X |
| 4,195,551 | 4/1980 | Schmiel | 251/68 |
| 4,252,252 | 2/1981 | Gross et al. | 222/641 X |
| 4,309,939 | 1/1982 | Stover | 99/307 X |
| 4,328,740 | 5/1982 | McDonough et al. | 99/305 X |
| 4,331,067 | 5/1982 | Mysicka et al. | 99/305 |
| 4,464,981 | 8/1984 | Stover | 99/305 X |
| 4,575,615 | 3/1986 | Shigenobu et al. | 99/279 |
| 4,621,571 | 11/1986 | Roberts | 99/305 X |
| 4,656,932 | 4/1987 | Kopp | 99/306 X |
| 4,697,502 | 10/1987 | English et al. | 99/306 X |
| 4,713,526 | 12/1987 | Smit | 99/283 X |
| 4,819,553 | 4/1989 | Heyn et al. | 99/305 |

Primary Examiner—Stephen F. Gerrity
Assistant Examiner—Reginald L. Alexander
Attorney, Agent, or Firm—Potthast & Ring

[57] ABSTRACT

A semiautomatic beverage maker (10) with a valve actuator or handle (12) for manually moving a valve (14) from a stop, closed position to a brew, open position through means of a mechanical linkage (20, 32, 36). The dispenser valve is held in the open position for a preselected brew time period by means of an electromagnet (53) which is energized through a timer switch (48) until the end of the time period, and then a coil spring (50) returns the dispenser valve (14) to the open position. In an emergency, the dispenser valve actuator (12) can be used to manually return the dispenser valve (14) to the open position before de-energization of the electromagnet (53) at the end of the brew time period. The dispenser valve actuator (12) also blocks removal of the ingredient holder, or brew basket (38) from its proper brew position when the dispenser valve (12) is open during the brew cycle.

30 Claims, 3 Drawing Sheets

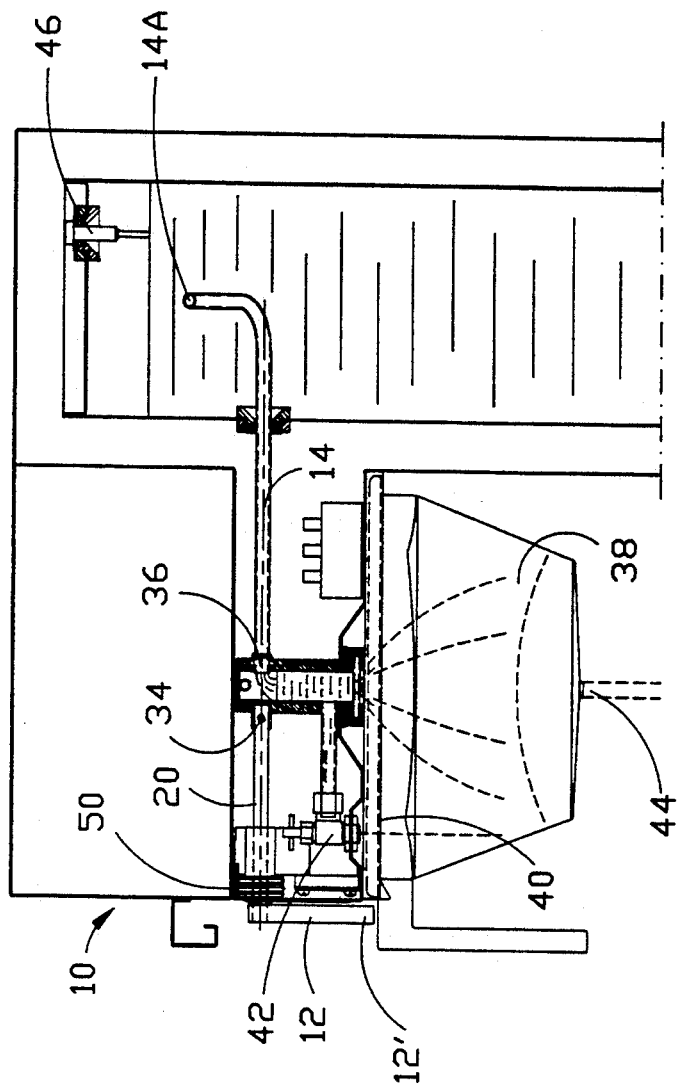
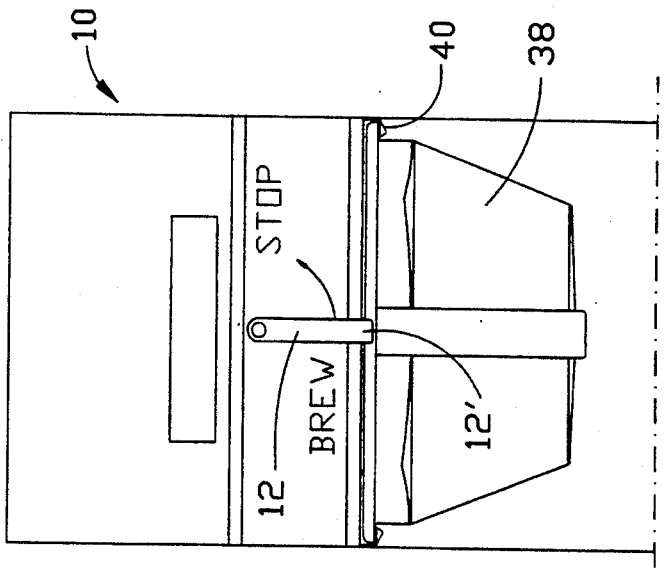

SEMIAUTOMATIC BEVERAGE MAKER AND METHOD

CROSS REFERENCE TO RELATED APPLICATION

This application is a continuation of application Ser. No. 07/570,861, filed Aug. 22, 1990, now abandoned, which is a continuation of application Ser. No. 07/352,754, filed May 16, 1989, now abandoned, which is a continuation in part of U.S. patent application No. 07/224,754 filed Jul. 27, 1988, now U.S. Pat. No. 5,000,082, the disclosure of which is hereby incorporated herein.

BACKGROUND OF THE INVENTION

This invention generally relates to a beverage maker and method of making beverage by passing hot water through a dry ingredient, such as ground coffee or tea and, specifically, to a semiautomatic beverage maker of this type and method of using same.

In the parent application of which this is a continuation-in-part, an automatic beverage maker is disclosed in which an electric motor is used to open and close a dispenser valve respectively in response to actuation of a start switch and lapse of a preselected brew period measured by a timer. In addition, a stop switch is provided to cause the motor to move the valve to a closed position before automatic closure at the lapse of the brew period. Other automatic beverage makers are known in which the dispenser valve is automatically caused to both open and close through selective energization and de-energization of an electromechanical valve drive mechanism in response to manual switch actuation. Examples of such automatic beverage makers are shown in U.S. Pat. No. 3,608,471 issued Sep. 28, 1971 to Martin and 3,998,144 issued Dec. 21, 1976, to Curtis.

While this is a perfectly acceptable and successful system for automatically operating a beverage maker, it still has certain disadvantages. First, it requires a motor to both open and close the valve and a stop switch which significantly adds to the cost of the apparatus. In addition, lights or other special indicators and associated circuitry are often required to indirectly provide a visual indication of the status of the dispenser valve which also adds to the costs. These additional parts, Of course, also contribute to the complexity of the apparatus and thereby reduce its reliability and increase the cost of equipment maintenance.

Another disadvantage of known automatic beverage makers is that when the dispenser valve is open and hot water is flowing, there is nothing to prevent removal of the ingredient holder which funnels the water to an urn from its normal position for collecting the water therein. As a result, a dangerous condition can result in which hot scalding water freely flows from the beverage maker and outside of the confines of an urn because of removal of the ingredient holder during the brew cycle.

SUMMARY OF THE INVENTION

It is the object of the present invention to overcome these disadvantages of known automatic beverage makers by providing an apparatus and method for semiautomatically operating the beverage maker.

This objective is achieved in part through provision of a dispenser valve assembly for selectively blocking and enabling removal through a dispenser outlet hole of liquid within a supply tank of a beverage maker at a uniform rate on a semiautomatic basis in which the dispenser valve is opened manually but is automatically returned to a closed position automatically at the end of a preselected time period, or early by manual means.

In the preferred embodiment of the beverage maker, the semiautomatic dispenser valve comprises a valve assembly with a valve member movable between an open position in which liquid in the supply tank flows through the valve and into the beverage container and a closed position in which liquid does not flow through the valve. The beverage maker also has means for manually moving the valve member to the open position, means for producing a return force to automatically return the movable valve member to the closed position, and means for holding the movable valve member against return to the closed position for a preselected time period after manual movement of the movable member to the open position. The movable member is automatically returned to the close position by the return force producing means upon release thereof by said holding means.

The objective is also achieved in part through provision in a beverage maker of a safety valve control assembly which prevents removal of an ingredient holder removably mounted in a location for safe receipt of liquid from the supply tank when the dispenser valve is in an open position. Preferably, the safety valve control assembly comprises an actuator for controlling the operation of the dispenser valve, a locking member, and means responsive to movement of the actuator for movement of the locking member between a locked position in which removal of the ingredient holder from the preselected safe location is prevented when the dispenser valve is open, and an unlocked position in which removal of the ingredient holder from the preselected safe position is enabled when the dispenser valve is closed.

It is a further object to provide a method of semiautomatically controlling the passage of liquid to a container from a supply tank of a beverage maker comprising the steps of manually moving a valve member from a closed position to an open position in which liquid is passed to the container, holding the valve member in the open position against automatic return thereof to the closed position, releasing the hold of the valve member, and automatically returning the valve member to the closed position in response to the hold thereon being released.

BRIEF DESCRIPTION OF THE DRAWINGS

The manner in which the foregoing objects are achieved will be explained in greater detail and further objects, features and advantages will be made apparent from the detailed description of the preferred embodiment that is given below with reference to the several views of the drawing, in which:

FIG. 2A is a front view of a portion of the semiautomatic beverage maker of the present invention showing the upper housing, an ingredient holder, the dispenser valve actuator and holder locking member in a closed position;

FIG. 2B is a partially sectional side view of the semiautomatic coffee maker of FIG. 2A showing the dispenser valve, the water supply tank, ingredient holder and dispenser valve actuator when the dispenser valve is in an open, brew position;

DETAILED DESCRIPTION

Figures 1A, 1B:
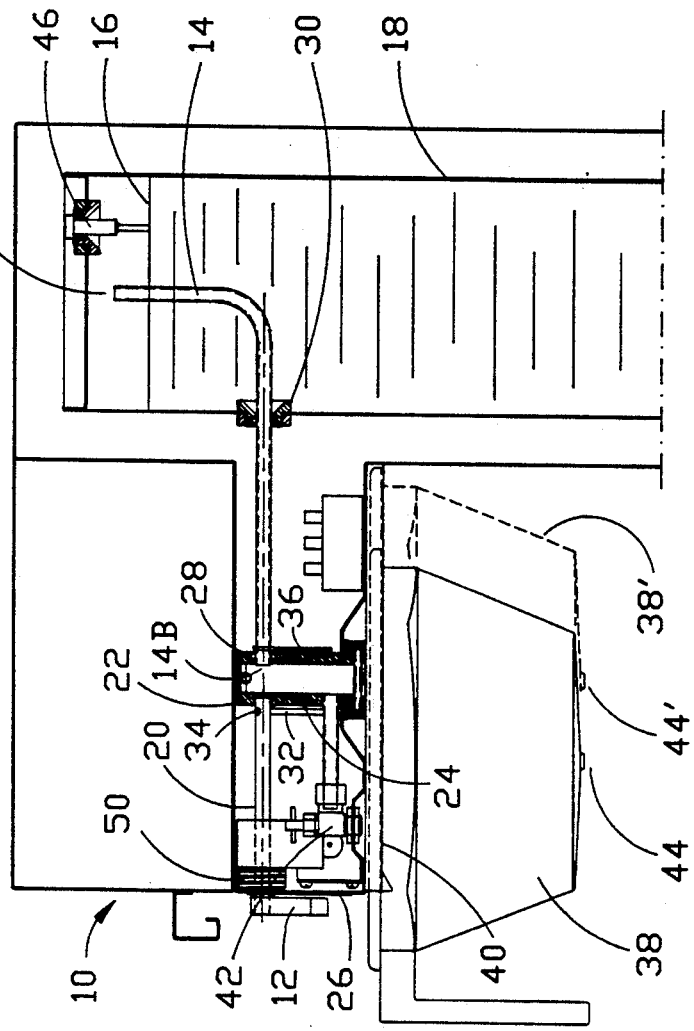
FIG. 1A is a front view of a portion of the semiautomatic beverage maker of the present invention showing the upper housing, an ingredient holder, the dispenser valve actuator and holder locking member in an open position.
FIG. 1B is a partially sectional side view of the semiautomatic coffee maker of FIG. 1A showing the dispenser valve, the water supply tank, ingredient holder and dispenser valve actuator when the dispenser valve is in a closed position.

Referring now to FIGS. 1A and 1B, the beverage maker 10 of the present invention is seen when in a stop or nonbrewing condition. When in the stop condition, a manual dispenser valve actuator 12 is in a relatively elevated position next to the word "STOP". As best seen in FIG. 1B, the manual dispenser valve actuator 12 is mechanically linked to a dispenser valve tube 14 such that when the manual valve actuator 12 is in the "STOP" position, as shown in FIG. 1A, the inlet valve opening 14A is elevated above a preselected surface level 16 of water within a supply tank 18 to a closed position. In this closed position, no water is allowed to enter the inlet end 14A and, thus, no water enters the tube 14 to be dispensed from the outlet valve opening 14B.

The mechanical linkage includes an elongate linkage rod 20 connected for rotation with the valve actuator or handle, 12 at one end and mounted for axial rotating movement at its other end in a cylindrical bore 22 within the side of an upstanding drain chamber 24. The end adjacent the valve actuator or handle, 12 is also mounted for axial rotary motion within a bearing hole through a front panel plate 26.

The horizontal section of the dispenser valve tube 14 is also mounted for rotary axial movement at a rotary, sealed bearing 28 at a side of the drain chamber 24 opposite the linkage rod 20 at one end and at a cylindrical rotary bearing 30 in the side of the supply tank 18 at the other end 14B. The axis of rotation of the dispenser valve tube 14 coincides with that of the linkage rod 20.

The ends of the linkage rod 20 at the dispenser valve tube 14 adjacent the drain chamber 24 are interconnected behind the drain chamber 24 by means of a C-shaped clamp assembly. The C-shaped clamp assembly includes an L-shaped arm 32 having a vertical section connected to linkage rod 20 by means of a screw 34 at the free end and a horizontal section which extends behind the drain chamber 24 to connect with one end of a plate 36. The other end of the plate 36, in turn, is connected to the dispenser valve tube 14 adjacent the drain chamber 24. Accordingly, when the valve actuator or handle, 12 rotates, the linkage rod C-shaped clamp assembly and the dispenser valve tube will rotate with it.

The ingredient holder 38 is mounted at its edges for sliding movement along L-shaped channels 40 to and from a fully engaged position, shown by broken line 38', at which it receives hot water from the drain chamber 24 and possibly also from a beverage strength control by-pass valve 42, and funnels and directs the hot beverage through a drain 44 in its bottom to a relatively small opening of an urn (not shown) located directly beneath the drain 44 when it is in the fully engaged position shown by broken line 44'. Removal of the ingredient holder 38 is required after each brew cycle in order to remove the old filter and depleted dry ingredient. Nothing prevents such removal when the actuator or handle 12 is in the stop position, as shown.

However, the brew basket 38 should not be fully removed or even partially removed, as shown in solid line in FIG. 1B, during the brew cycle, for in that event hot scalding water from the drain chamber 24 and by-pass valve 42 will not be directed into the open mouth of the urn (not shown) and can splash on the operator, counters and floors causing possible injury and damage.

Referring now to FIGS. 2A and 2B, the object of the invention is achieved in part through virtue of the fact that when the valve actuator, or handle, 12 is mounted in a position relative to the ingredient holder 38 and mounting channels 40 such that its distal end 12' extends below the channels 40 in a position to block sliding removal of the ingredient holder 38 from the fully engaged safe position shown in FIG. 2B whenever the actuator 12 is moved to the relatively lower, or vertical "BREW" position shown in FIG. 2A. While it is preferred to directly block brew basket removal in this direct mechanical fashion, it is also contemplated to block removal of the brew basket indirectly with an electromagnet latch which is automatically moved into blocked position whenever the brew cycle is in process either by actuation of a start switch or manually, as here.

In any event, when the dispenser valve tube 14 is rotated to the open position with the inlet opening 14A beneath the surface 16 of the hot water in supply tank 18 and the actuator arm 12 is in the "BREW" position as shown, the ingredient holder 38 cannot be removed. Thus, the hot water which flows through tube 14, out of outlet 14B and through the drain chamber 24 and overflow valve 42 can only drain into the ingredient holder 38 and from therethrough the drain 44 into the urn (not shown). In order to remove the ingredient holder 38, the actuator arm must first be raised to the "STOP" position in which the inlet end 14A of the diagram valve tube 14 is elevated above the preselected surface level 16. The surface level 16 is maintained by means of an inlet valve (not shown) which is controlled in response to a level sensor 46 to maintain the level 16 constant.

Figure 1C:
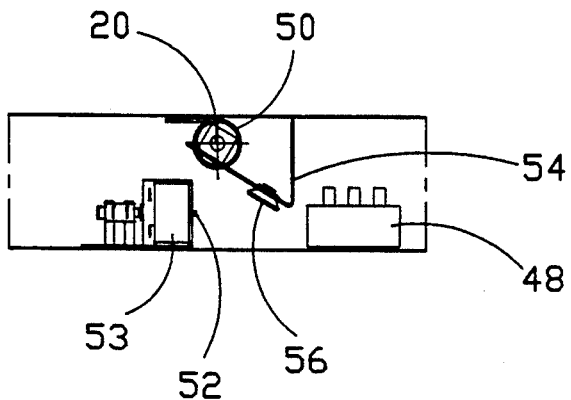
FIG. 1C is a front sectional view of the semiautomatic beverage maker of FIG. 1A in which the timer, dispenser valve opening means and means for holding the dispenser valve in a closed position are shown.
Figure 2C:
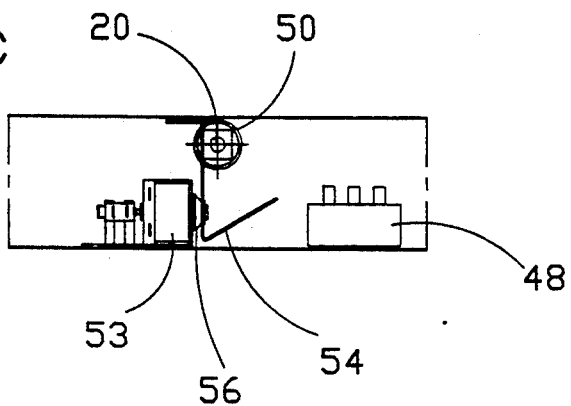
FIG. 2C is front sectional view of the semiautomatic beverage maker of FIG. 2A in which the timer, dispenser valve opening means and means for holding the dispenser valve in an open position are shown.
Figure 3:
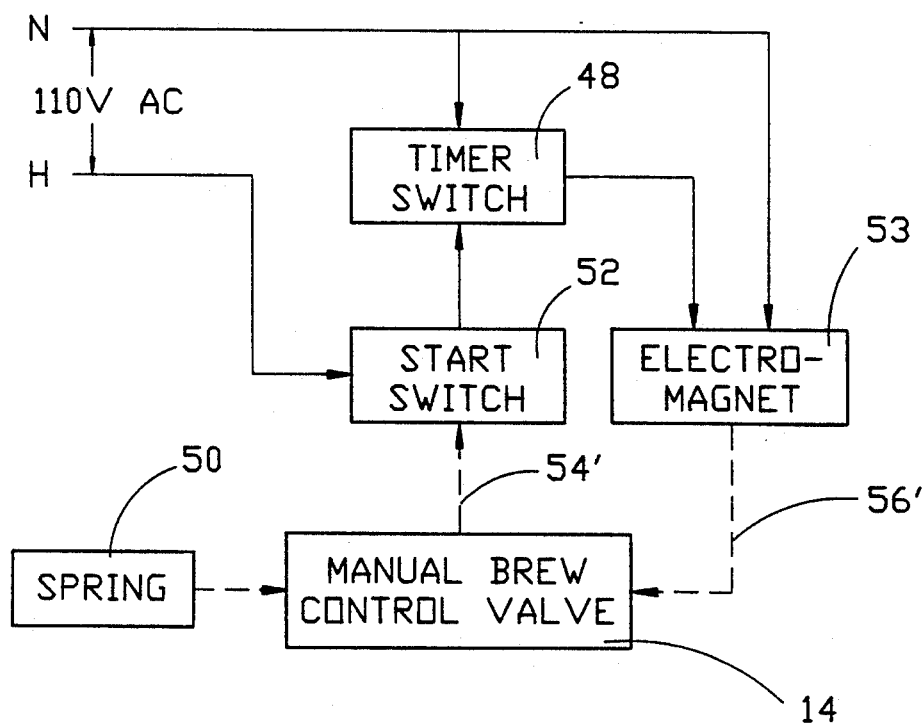
FIG. 3 is a functional block diagram of the preferred embodiment of control circuit for the semiautomatic beverage maker of FIGS. 1A, 1B, 1C, 2A, 2B and 2C.

Referring now to FIGS. 1C, 2C and 3, the preferred embodiment of the control unit for the semiautomatic beverage maker 10 includes a timer switch 48, a coil spring, or spring, 50, also seen in FIGS. 1B and 2B, a start switch 52, and a solenoid or electromagnet 53 and a start switch actuator arm 54 providing a mechanical linkage 56' between the dispenser valve, or manual brew control valve, 14 and the start switch 52. The electromagnet 53 also has a mechanical linkage 56' to the manual brew control valve 14 through means of a ferromagnetic armature head 56 carried at the end of start switch actuator 54, as best illustrated in FIG. 2C. The spring 50 also has a linkage 50' to the dispenser valve.

Referring to FIGS. 1C and 3, when the brew control valve 14 is manually moved from the "STOP" position to the "BREW" position, the start switch actuator 54 and ferromagnetic armature head 56 carried thereby are moved from the "STOP" position, shown in FIG. 1C, in which it is normally held by spring 50, to the "BREW" position shown in FIG. 2C, in which it is magnetically held due to energization of the electromagnet 53. When the electromagnet 53 is de-energized, the ferromagnetic armture head 56 is released and the coil spring 50 causes the start switch actuator arm 54 to return to the "STOP" position shown in FIG. 1C.

Referring to FIG. 3, particularly, the armature head 56 causes the normally open start switch 52 to close when it is manually moved to the "BREW" position. This causes the normally open timer switch 48 to close to apply 110 VAC power to energize electromagnet 53. The energized electromagnet 53, in turn, holds the ferromagnetic actuator arm 54 in position to keep the start switch 52 closed. After a preselected time period for brewing, approximately four minutes, after actuation of the start switch, the timer causes the timer switch 48 to revert to its normally open condition. This de-energizes the electromagnet 53 which releases its hold through armature head 56 to the start switch actuator arm 54 which is then returned by the spring 50 to the "STOP" position and the start switch is then deactuated.

Advantageously, if it is desired to interrupt the brew cycle before the end of the preselected time period, all that is required is to manually move the dispenser valve actuator or handle 12 from the "BREW" position to the "STOP" position. This will immediately stop the flow of hot water in an emergency. Deactuation of the start switch also causes the timer switch 48 to automatically reset to zero time to start a new brew cycle in response to the next actuation of the start switch 52.

While other devices could be used, in the preferred embodiment a C-9, C-Frame AC Power Solenoid made by Deltrol Controls Division of Deltrol Corp. as published at page 24 of their 1988 catalog was used for the electromagnet 53. A Solid-State Cube Timer Interval, Q-4 Series made by National Controls and published at page 8 of their 1988 catalog was used for the timer switch 48. The start switch 52 was a Miniature, Light Force, E Series switch made by Cherry Electrical Products and published at page 18 of their 1988 catalog. The coil spring was selected to have more than sufficient strength to return the armature head to the "STOP" position.

While a particular embodiment has been disclosed, it should be appreciated that many variations may be made with respect thereto without departing from the spirit and scope of the invention as defined in the appended claims. For instance, although a particular type of rotary valve is used, the invention can be employed with other types of valves which can be manually energized. Although, the valve actuator, or handle 12 performs multiple functions, it should be appreciated that blocking removal of the ingredient holder could be done indirectly in response to start brew switch actuation in a fully automatic brewer or manual actuation in this semiautomatic maker. The spring 50 could be eliminated by reorienting the actuator arm 54 so that gravity causes it to move to the closed position upon release by the electromagnet 53. The electromagnet could control a latch to hold the actuator arm 54 when the electromagnet was de-energized instead of energized. Other variations will occur to persons of skill in the art of coffee makers.

I claim:

1. In a beverage maker having a supply tank for holding liquid to be selectively passed to a beverage container, the improvement being a semiautomatic dispenser valve assembly, comprising:
   a valve assembly with a valve member movable between
   an open position in which liquid in the supply tank flows through the valve and into the beverage container and
   a closed position in which liquid does not flow through the valve;
   means for manually moving the valve member to the open position;
   means for producing a return force to automatically return the valve member to the closed position;
   means for selecting a time period; and
   means for holding the valve member against return to the closed position for the selected time period after manual movement of the valve member to the open position, said valve member being automatically returned to the closed position by said return force producing means upon release of the valve member by said holding means at the end of the selected time period, said holding means including an electromagnet,
   a ferromagnetic material carried by the valve member, and
   means for mounting said electromagnet relative to a path of movement of the ferromagnetic material to be engaged thereby when the valve member is moved to the open position.

2. The beverage maker of claim 1 in which
   said valve member is a bent tube with open and closed positions for passing the liquid therethrough when in the open position and having a center axis, and
   said manually means includes means for rotating said tube around said center axis between the open and closed positions.

3. The beverage maker of claim 1 in which said manually moving means includes
   a handle actuator, and
   means for connecting the handle actuator to the valve member to move it between said open and closed positions with corresponding movements of the actuator handle between blocking and nonblocking positions with respect to the beverage container.

4. The beverage maker of claim 1 in which said holding means includes
   a timer, and
   means responsive to said valve member being moved to the open position to cause the timer to start measuring the preselected time period.

5. The beverage maker of claim 4 in which said holding means includes
   means for energizing the electromagnet in response to the valve member being moved to the open position, and
   means for de-energizing the electromagnet in response to lapse of said preselected time period.

6. The beverage maker of claim 1 in which said holding means includes
   means for energizing the electromagnet in response to the valve member being moved to the open position, and means for de-energizing the electromagnet in response to lapse of said preselected time period.

7. The beverage maker of claim 1 in which said return force producing means includes a spring connected to said valve member to bias it for movement to the closed position.

8. The beverage maker of claim 7 in which said electromagnet is of sufficient magnetic strength to overcome the return force generated by said spring.

9. The beverage maker of claim 1 in which
said valve member is mounted for rotary movement, and
said spring is a coil spring.

10. The beverage maker of claim 1 in which the spring is
tightened by manual movement of the valve member to the open position, and is
loosened when it moves the valve member to the closed position.

11. The beverage maker of claim 1 including
an ingredient holder removably mounted at a location to receive liquid from the tank when the dispenser valve assembly is open, and
means for preventing removal of the ingredient holder from said location when the valve member is moved to the open position.

12. In a beverage maker having a supply tank for temporarily holding liquid at a preselected level to be passed via a dispenser valve through an ingredient holder removably mounted in a preselected location for safe receipt of liquid from the supply tank when the dispenser valve is in an open position, the improvement being a safety valve control assembly, comprising:
a valve assembly including a relatively rigid bent tube with an inlet end located within the supply tank and an outlet end located outside of the supply tank for dispensing liquid to the ingredient holder;
means for sensing the preselected water level;
means for mounting the tube for rotation to raise and lower the inlet end above and below the preselected level of the liquid in the supply tank to respectively close and open the valve assembly; and
an actuator for controlling the operation of the dispenser valve including
a locking member connected to the bent tube to rotate therewith between
A locked position in which removal of the ingredient holder from the preselected safe location is prevented when the dispenser valve is open and
an unlocked position in which removal of the ingredient holder from the preselected safe position is enabled when the dispenser valve is closed.

13. The beverage maker of claim 12 in which
said dispenser valve includes a valve member mounted for movement between open and closed positions to respectively open and close the valve, and
said locking member is mechanically linked to the actuator and includes a handle accessible for manually moving the valve member between said open and closed positions.

14. The beverage maker of claim 13 in which the position of said handle provides a visual indication of whether the dispenser valve is in the open position.

15. The beverage maker of claim 12 in which said locking member is connected to the valve to move therewith between the locked and unlocked positions.

16. In a beverage maker having a supply tank for temporarily holding a liquid to be selectively passed to a beverage container, the improvement being a semiautomatic dispenser valve assembly, comprising:
a valve member;
means including an electromagnet for manually moving a valve member from a closed position to an open position in which liquid is passed to the container;
means for holding the valve member in the open position against automatic return thereof to the closed position;
means for releasing the hold of the valve member by controlling the energization of an electromagnet; and
means for automatically returning the valve member to the closed position in response to the hold thereon being released.

17. The beverage maker of claim 16 in which the releasing means includes means for terminating energization of the electromagnet after a preselected time period to release hold of the valve member.

18. The beverage maker of claim 16 in which the releasing means includes means to de-energize the electromagnet to release hold of the valve member.

19. The beverage maker of claim 16 in which said releasing means includes
means for establishing a normal timed cycle, and
means for manually moving the valve member out of holding engagement with the electromagnet to interrupt a normal timed cycle.

20. In a beverage maker having a supply tank for temporarily holding a liquid to be selectively passed to a beverage container positioned to receive liquid from the supply tank, the improvement being a semiautomatic dispenser valve assembly comprising:
a valve member with open and closed positions;
means for manually moving the valve member from the closed position to the open position in which liquid is passed to the container;
means for holding the valve member in the open position against automatic return thereof to the closed position including an electromagnet;
means for releasing hold of the valve member including
means for automatically de-energizing the electromagnet at the end of a preselected tim period, and
means for manually moving the valve member out of holding engagement with an electromagnet before the end of the preselected time period for holding the valve member in an open position; and
means for automatically returning the valve member to the closed position in response to the hold thereon being released.

21. The beverage maker of claim 16 in which the releasing means includes means for automatically releasing the hold of the valve member when an electrical power failure occurs.

22. The ingredient holder of claim 11 including
means for automatically disabling the removal preventing means to allow the release of the ingredient holder at the end of said preselected time period.

23. The beverage maker of claim 13 in which the position of said handle provides a visual indication of whether the dispenser valve is in the closed position.

24. The beverage maker of claim 13 in which the handle rotates in a plane parallel to a front panel plate of the beverage maker.

25. The beverage maker of claim 6 in which said holding means includes means for the electromagnet remaining energized during said preselected time period.

26. With a beverage maker having a supply yank for temporarily holding liquid, a method of controlling the passage of said liquid to a container, comprising the steps of:
   manually moving a valve member from a closed position to an open position in which liquid is passed to the container;
   holding the valve member in the open position against automatic return thereof to the closed position;
   releasing the hold of the valve member by controlling the energization of an electromagnet; and
   automatically returning the valve member to the closed position in response to the hold thereon being released.

27. The method of claim 26 in which the energization of the electromagnet is terminated after a preselected time period to release hold of the valve member.

28. The method of claim 26 in which the electromagnet is de-energized to release hold of the valve member.

29. The method of claim 26 in which said step of releasing is performed by manually moving the valve member out of holding engagement with the electromagnet to interrupt a normal timed cycle.

30. With a beverage maker having a supply tank for temporarily holding liquid, a method of controlling the passage of said liquid to a container, comprising the steps of:
   manually moving a valve member from a closed position to an open position in which liquid is passed to the container;
   holding the valve member in the open position against automatic return thereof to the closed position;
   releasing the hold of the valve member by manually moving the valve member out of holding engagement with an electromagnet before the end of a preselected time period for holding the valve member in an open position has lapsed; and
   automatically returning the valve member to the closed position in response to the hold thereon being released.

* * * * *

UNITED STATES PATENT AND TRADEMARK OFFICE
CERTIFICATE OF CORRECTION

PATENT NO. : 5,331,885

DATED : July 26, 1994

INVENTOR(S) : Zbigniew G. Lassota

It is certified that error appears in the above-identified patent and that said Letters Patent is hereby corrected as shown below:

Column 1, line 47 change "Of" to -- of --;

Column 5, line 46, after "Force" delete "." and insert -- , --;
Column 7, line 48, change "A" to -- a --;
Column 8, line 47, after "preselected" delete "tim" and insert
-- time --;
Column 9, line 6, after "supply" delete "yank" and insert -- tank --.

Signed and Sealed this

Thirteenth Day of December, 1994

Attest:

BRUCE LEHMAN

*Attesting Officer*     *Commissioner of Patents and Trademarks*